Sept. 2, 1958  B. LAZICH  2,850,258
ELECTROMAGNETICALLY OPERATED VALVE
Filed Aug. 3, 1955

United States Patent Office 2,850,258
Patented Sept. 2, 1958

2,850,258

ELECTROMAGNETICALLY OPERATED VALVE

Branko Lazich, Pittsburgh, Pa., assignor to Robertshaw-Fulton Controls Company, Greensburg, Pa., a corporation of Delaware Application August 3, 1955, Serial No. 526,106

3 Claims. (Cl. 251—77)

This invention relates to electromagnetic operated devices and more particularly to electromagnetically operated valves.

In devices of the described type, it has been customary to isolate the coil and core from the valve chamber by a thin sealing member of non-magnetic material. The armature is positioned in the valve chamber and operatively connected to the valve member to operate the same between open and closed positions. The armature generally takes the form of a disk-shaped member which is reciprocable between attracted and released positions or a lever which is pivotable between attracted and released positions. Means are provided for biasing the armature to the released position to insure positive closing of the valve member and prevent sticking of the armature.

It is well known in the art that the force necessary to attract the armature from its released position to overcome the air gap and biasing force is large compared to the force required to hold the armature in engagement with the sealing disk or core. Thus, the core and coil on such devices have been of necessity large and inefficient.

Another factor which contributes to the inefficiency of such devices is the air gap presented by the non-magnetic sealing member. Even in the attracted position of the armature, an air gap exists since the non-metallic seal is part of the air gap in the magnetic circuit. Since the magnetic flux must pass through the seal twice, the effective air gap is double the thickness of the seal.

It is an object of this invention to increase the efficiency of an electromagnetic valve.

Another object of this invention is to isolate the electrical circuit of an electromagnetic valve while at the same time maintaining a minimum air gap in both the attracted and released positions of the armature.

Another object of this invention is to insure more positive operation of the electromagnetic valve by reducing the air gap to a minimum when the armature is in released position.

In a preferred embodiment of the invention, a lever type armature is positioned within a valve chamber and operatively connected to a valve member which is reciprocable between open and closed positions relative to a valve seat for controlling the flow of fluid. Electromagnetic means including a coil and core is isolated from the valve chamber by a sealing plate of magnetic material. A cover also of magnetic material encloses the electromagnetic operator and cooperates with the sealing plate to provide a magnetic circuit. Pivoting means are provided for the armature whereby a portion thereof is always positioned intimately close to the sealing plate and magnetic circuit.

Other objects and advantages will become apparent from the following description taken in connection with the accompanying drawings wherein.

Figure 1:
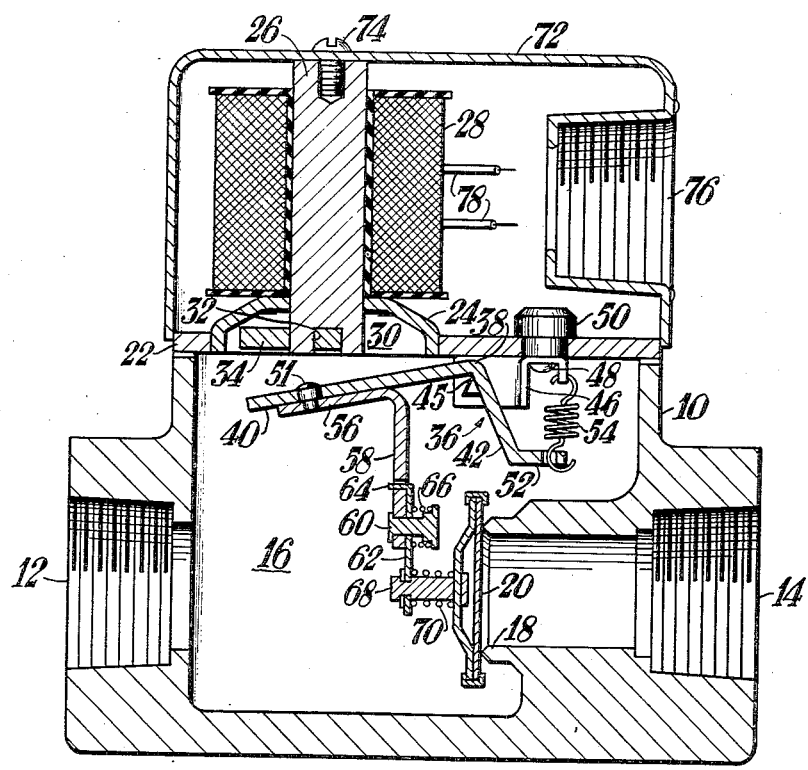
Fig. 1 is a longitudinal sectional view of an electromagnetically operated valve embodying this invention.

Referring more particularly to Fig. 1, the electromagnetic valve includes a valve casing 10 which is preferably of non-magnetic material and provided with an inlet 12 and an outlet 14 for fluid. The inlet 12 and outlet 14 communicate with a valve chamber 16 in which a valve seat 18 is formed on a portion of the casing 10 forming a continuation of the outlet 14. A disk-shaped valve member 20 is movable into and out of engagement with the valve seat 18 and cooperates therewith to control the flow of fluid between the inlet 12 and outlet 14.

The upper side of the valve casing 10 has attached thereto a cover plate 22 which is operative to seal the valve chamber 16 and isolate the electromagnetic operator now to be described from the valve chamber 16. The cover plate 22 is provided with a circular opening into which a cup-shaped washer 24 preferably of non-magnetic material is secured as by silver soldering.

The electromagnetic operator includes a magnetic core 26 which is axially aligned with the washer 24 and encircled by an electromagnetic coil 28 over a substantial portion of its length. The lower end of the core 26 extends through a suitable centrally disposed bore in the washer 24 and into a chamber 30 defined by the inner surface of the washer 24. The end surface of the core 26 lies in a plane defined by the bottom surface of the cover plate 22 and is bifurcated to define a slot 32 into which a metal washer 34, preferably of copper, is pressed to provide a single-turn shading coil. As will become apparent hereinafter the washer 34 is operative to retard the flux in one-half of the pole face when the coil 28 is energized by an alternating current.

For operating the valve member 20 between open and closed positions in response to energization of the electromagnetic operator, an armature 36 is positioned within the valve chamber 16. The armature 36 takes the form of a generally L-shaped lever and defines an angular portion 38 from which extend two legs 40, 42. The armature 36 is pivoted at its angular portion 38 on a knife edge 45 defined by a bracket 46 which is mounted on the underside of the cover plate 22 by a screw 48 and a threaded bushing 50 fixed within the cover plate 22.

The angular portion 38 is positioned to be intimately close to the underside of the cover plate 22 and will remain in this relationship with the cover plate 22 during all positions of the armature 36. The leg 40 underlies the end of the core 26 and washer 24 and is provided with a non-magnetic stop 51 which engages the lower end of the core 26 in the attracted position of the armature 36 to provide a very slight air gap between the leg 40 and core 26. The other leg 42 extends toward the valve seat 18 and is provided with an angular extension 52. A spring 54 is mounted in tension between the extension 52 and bracket 46 and is operative to bias the armature 36 in a counterclockwise direction to its released position as shown.

Attached to the underside of the leg 40 is a generally L-shaped extension bracket 56 which, in the position shown in Fig. 1, has one leg 58 extending substantially perpendicular to an axis defined by the valve member 20 and the valve seat 18. The leg 58 carries on one end thereof a pin 60 and a connecting member 62 which is slidably positioned on the pin 60 between a shoulder of the pin 60 and the leg 58. Alignment of the member 62 with the leg 58 is assured by an upper upturned end 64 of the member 62 which is slidably positioned in a slot in the leg 58. A spring 66 is mounted in compression between the member 62 and another shoulder of the pin 60.

The member 62 extends from the leg 58 and carries on the lower end thereof a pin 68 which is slidably connected to the valve member 20. A spring 70 encircles the pin 68 and is mounted in compression between the valve member 20 and member 62 to make the connection between the valve member 20 and member 62 self-aligning.

When the coil 28 is deenergized, the valve member 20 is biased into engagement with the valve seat 18 by the spring 54 and the fluid pressure within the chamber 16. Thus, the armature 36 must move against the biasing force of spring 54 and the fluid pressure when the coil 28 is energized. However, the spring 66 is selected to be of sufficient strength whereby initial movement of the armature 36 will cause movement of pin 60 within the member 62 and compression of spring 66, thereby permitting the armature 36 to move closer to the core 26 before it must move against the fluid pressure load on the valve member 20. Thus, maximum efficiency is insured at the time of pickup.

A cover 72 of preferably magnetic material encloses the coil 28 and core 26 and has the end thereof fitted over the cover plate 22. A screw 74 extends through the upper wall of the cover 72 and is threaded in the upper end of the core 26 to provide a means for attaching the cover 72. As will be later seen, the cover 72 is operative to enclose the electromagnetic operator while at the same time providing a flux path when the coil 28 is energized.

An internally threaded bushing 76 is formed integrally with a side wall of the cover 72 and projects toward the electromagnet to provide a means for fastening a flexible cable or conduit (not shown) to the cover 72. The coil 28 is provided with two extending leads wires 78, 78 which may be connected by means of the cable or conduit to a source of electric energy.

Operation

For an example of the application of the device, assume that the inlet 12 and outlet 14 are connected to a source of fuel and a fluid fuel burner (not shown) respectively. The leads 78, 78 of the coil 28 may be connected in an electric circuit whereby the energization of the coil 28 is controlled by a thermostat (not shown) which may be positioned to be responsive to the heat produced by the burner.

If the temperature to be controlled is above a predetermined value, the components of the device will be positioned as shown in Fig. 1 with the valve member 20 being urged into engagement with the valve seat 18 by the combined action of tension spring 54 and the fluid pressure within chamber 16. With the valve member 20 in this position, it will be noted that one side of the angular portion 38 of armature 36 is seated and pivotally supported on knife edge 45 while the other side thereof extends into close proximity to the undersurface of cover plate 22. Spring 54 will exert an upward thrust on the armature 36 tending to lift angular portion 38 off knife edge 45, but the downward pull exerted on the armature 36 by the fluid pressure acting on valve member 20 will more than exceed the upward thrust of the spring 54 and thereby maintain the engagement of angular portion 38 and the knife edge.

Should the thermostat call for heat, the coil 28 will be energized to produce an alternating magnetic flux which will exert a force on the leg 40 of the armature 36. This force will produce a combination translatory and rotary movement of the armature 36 whereby the angular portion 38 thereof will be lifted upwardly out of engagement with knife edge 45 and into engagement with the undersurface of the cover plate 22, about which point of engagement the armature 36 will be rotated in a clockwise direction. This clockwise rotation of armature 36 will produce a corresponding clockwise rotation of bracket 56 and pin 60 until the shoulder on pin 60 engages the connecting member 62 whereupon the valve member 20 will be moved out of engagement with the seat 18. The assembly comprising the armature 36, bracket 56, connecting member 62, pins 60, 68, and valve member 20 will then rotate as a unit about the point of engagement between angular portion 38 and cover plate 22 until the pin 51 of the leg 40 engages the core 26. The valve member 20 is now in an open position and will remain there as long as coil 28 remains energized.

When the demand for heat is satisfied, coil 28 will be deenergized whereupon the magnetic flux will decay and release the armature 36. With the magnetic force removed, spring 54 in combination with the fluid pressure acting on valve member 20 becomes operative to rotate armature 36 counterclockwise until the valve member 20 again engages the valve seat 18 and angular portion 38 moves into engagement with knife edge 45.

Figure 2:
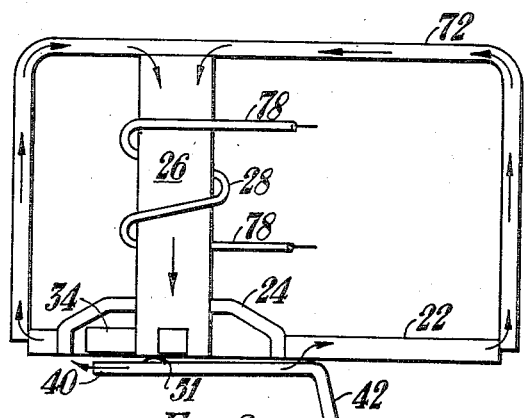
Fig. 2 is a schematic showing of the parts of Fig. 1 defining the magnetic circuit with the flux path indicated.

Referring now to the magnetic circuit shown schematically in Fig. 2, it will be apparent that the invention is capable of more efficient operation than contemporary devices of this type. Since the cover 72 and cover plate 22 are both of magnetic material, the coil 28 when energized sets up a magnetic flux which as indicated by the arrows passes through the core 26, the lower pole faces of the core 26, the leg 40 of armature 36, the cover plate 22, and the walls of the cover 72 to the other pole faces of the core 26. Thus, the invention utilizes a cover 72 and cover plate 22 as a path for the magnetic flux as well as for a sealing means.

Referring now to the released position of the armature 36 shown in Fig. 1, it will be noted that the angular portion 38 is pivoted intimately close to the cover plate 22 which is part of the magnetic circuit and which defines a pole face when the coil 28 is energized. Thus, the air gap betwen angular portion 38 and plate 22 is very minute while the air gap between the leg 40 and core 26 increases with distance from the portion 38. When the coil 26 is energized the force exerted on the leg 40 will be large near the angular portion 38 and decrease over the length of the leg 40 due to the increasing air gap. However, the minute air gap between the leg 40 and plate 22 adjacent the angular portion 38 results in a large moment to be exerted on the leg 40 at that point. Thus, the resultant pickup force exerted on the leg 40 is large, and accordingly, the device is capable of more efficient operation than previously obtained in such devices.

The shading disk 34 enables the device to be operated by either alternating or direct current. When the coil 28 is energized by an alternating current, the disk 34 is operative as a single-turn shading coil to retard the flux in one-half of the pole face area.

While only one embodiment of the invention has been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. In an electromagnetically operated fluid valve, the combination comprising a casing having an inlet and an outlet for fluid therein intersected by a valve seat, a chamber in said casing in communication with said inlet and said outlet, an apertured magnetic-material plate overlying an opening in a wall of said casing and forming a component of a magnetic circuit, a non-magnetic member positioned within said aperture in said plate for sealing said chamber, electromagnetic means including a core member and an armature, said core member being carried by said non-magnetic member, means in said chamber defining a knife edge, said armature being rotatably supported on said knife edge and being movable in one direction of rotation in response to energization of said electromagnetic means, said armature comprising another component of said magnetic circuit and having a portion thereof disposed in close proximity to said plate for bridging said aperture and thereby the magnetic flux gap between said plate and said core member, means in said chamber urging said armature in the opposite direction of rotation upon de-energization of said electromagnetic means, a magnetic-material cover encasing said electromagnetic means and comprising another component of said magnetic circuit, and a valve member operatively connected to said armature and being movable therewith upon energization and de-energization of said electromagnetic means between a plurality of controlling positions relative to said valve seat.

2. In an electromagnetically operated fluid valve, the combination comprising a casing having an inlet and an outlet for fluid therein intersected by a valve seat, a chamber in said casing in communication with said inlet and said outlet, a magnetic-material plate overlying an opening in a wall of said casing and having an aperture communicating said chamber with the exterior of said casing, said plate forming a component of a magnetic circuit, non-magnetic closure means for said aperture, electromagnetic means including a core member and an armature, said core member being carried by said closure means, means attached to said plate and defining a knife edge within said chamber, said armature being pivotally supported on said knife edge for movement in one direction of rotation upon energization of said electromagnetic means, said armature comprising another component of said magnetic circuit and having a portion thereof adjacent said knife edge disposed in close proximity to said plate for bridging said aperture and thereby the magnetic flux gap between said plate and said core member, means in said chamber urging said armature in the opposite direction of rotation, a magnetic-material cover housing said electromagnetic means and comprising another component of said magnetic circuit, and a valve member operatively connected by a lost-motion connection to said armature for movement therewith upon energization and de-energization of said electromagnetic means between a plurality of controlling positions relative to said valve seat, said lost-motion connection upon energization of said electromagnetic means permitting said armature to move closer to said electromagnetic means prior to effecting movement of said valve member.

3. In an electromagnetically operated fluid valve as claimed in claim 2 wherein said armature is generally L-shaped having an angled portion and is rotatably supported on said knife edge by said angled portion.

References Cited in the file of this patent
UNITED STATES PATENTS

| | | |
|---|---|---|
| 1,552,446 | Radley | Sept. 8, 1925 |
| 1,664,612 | French | Apr. 3, 1928 |
| 2,233,925 | Stimson | Mar. 4, 1941 |
| 2,321,853 | Ray | June 15, 1943 |
| 2,442,016 | Poole | May 25, 1948 |
| 2,442,877 | Ray | June 8, 1948 |
| 2,691,705 | Ray | Oct. 12, 1954 |